(12) United States Patent
Moser

(10) Patent No.: US 6,957,721 B2
(45) Date of Patent: Oct. 25, 2005

(54) HYDRAULIC ELEVATOR WITH AN ACCUMULATOR

(75) Inventor: Daniel Moser, Menzingen (CH)

(73) Assignee: Bucher Hydraulics AG, Neuheim (CH)

( * ) Notice: Subject to any disclaimer, the term of this patent is extended or adjusted under 35 U.S.C. 154(b) by 164 days.

(21) Appl. No.: 10/333,166

(22) PCT Filed: Aug. 9, 2001

(86) PCT No.: PCT/CH01/00489
§ 371 (c)(1),
(2), (4) Date: Mar. 17, 2003

(87) PCT Pub. No.: WO02/14199
PCT Pub. Date: Feb. 21, 2002

(65) Prior Publication Data
US 2003/0173159 A1 Sep. 18, 2003

(30) Foreign Application Priority Data
Aug. 18, 2000 (CH) .............................................. 1611/00

(51) Int. Cl.⁷ ................................................. B66B 1/28
(52) U.S. Cl. ...................................... 187/285; 187/275
(58) Field of Search ................................ 187/275, 285, 187/345, 347; 60/413, 414, 464, 468, 488, 494; 318/481; 417/280, 321, 2–9, 16, 18

(56) References Cited
U.S. PATENT DOCUMENTS

| | | | | |
|---|---|---|---|---|
| 2,269,786 A | * | 1/1942 | Rose | ............................ 187/274 |
| 3,762,165 A | * | 10/1973 | Takenoshita et al. | .......... 60/445 |
| 3,842,943 A | * | 10/1974 | Nakamura et al. | ........... 187/275 |
| 3,892,292 A | * | 7/1975 | Takenoshita et al. | ........ 187/275 |
| 4,638,888 A | * | 1/1987 | Coy | ............................ 187/270 |
| 4,761,953 A | * | 8/1988 | Rosman | ......................... 60/414 |
| 5,281,774 A | | 1/1994 | Masaki | ........................ 187/110 |
| 5,349,142 A | | 9/1994 | Hasegawa | .................... 187/110 |
| 5,579,868 A | | 12/1996 | Pelto-Huikko | ............... 187/275 |
| 5,648,644 A | * | 7/1997 | Nagel | .......................... 187/288 |
| 6,142,259 A | | 11/2000 | Veletovac et al. | ........... 187/287 |
| 6,505,711 B1 | * | 1/2003 | Zurcher et al. | .............. 187/285 |
| 6,584,769 B1 | * | 7/2003 | Bruun | ........................... 60/414 |
| 6,739,127 B2 | * | 5/2004 | Nippert et al. | ................. 60/414 |

* cited by examiner

Primary Examiner—Jonathan Salata
(74) Attorney, Agent, or Firm—Cohen, Pontani, Lieberman & Pavane

(57) ABSTRACT

A pump is situated between the hydraulic drive and the accumulator, this pump being driven by a motor and conveying hydraulic oil from the hydraulic drive to the accumulator and vice versa without the presence of control valves which influence the flow of hydraulic oil, such as proportionally pilot-operated valves. Since the pump is subjected to the pressure $P_z$ in the cylinder line and the pressure $P_s$ in the accumulator line, the motor of the pump only has to work against the differential pressure and in certain operating states, can even function as a generator and release electrical energy through a power output device controlling it. The speed of the car is controlled through the control of the motor alone by a control and regulation device, through the power output device.

12 Claims, 4 Drawing Sheets

HYDRAULIC ELEVATOR WITH AN ACCUMULATOR

PRIORITY CLAIM

This is a U.S. national stage of application No. PCT/CH01/00489, filed on 9 Aug. 2001. Priority is claimed on that application and on the following application: Country: Switzerland, Application No.: 1611/00, Filed: 18 Aug. 2000.

BACKGROUND OF THE INVENTION

1. Field of the Invention

The invention pertains to a hydraulic lift or elevator of the type having a hydraulic drive, a pressure accumulator, a main pump for producing a flow of hydraulic oil between the pressure accumulator and the hydraulic drive, and a changing pump for changing the pressure accumulator with hydraulic oil from a tank.

2. Description of the Related Art

A hydraulic elevator of the type indicated above is known from U.S. Pat. No. 5,349,142. In this publication, the elevator is called an energy-conservation type elevator. Speed-adjusting valves, one in the line from the pump to the drive, the other in the line from the pump to the pressure accumulator, are provided to control the acceleration/deceleration curves. It is also disclosed that the main pump is driven by an electric motor, which is controlled by an inverter.

EP-A1-829 445 describes a device in which, under certain conditions, the motor, which is coupled to the pump, acts as a generator, so that excess hydraulic energy is converted to electrical energy and can therefore be recovered.

U.S. Pat. No. 5,281,774 describes a control device for a hydraulic elevator, in which the electric motor which drives the pump is controlled by an inverter.

A hydraulic elevator with a pressure accumulator is also known from U.S. Pat. No. 5,579,868. In one of the design variants of this elevator, a first pump is installed between the hydraulic drive for the elevator and the pressure accumulator; this pump is used to influence the flow of hydraulic oil between the hydraulic drive and the pressure accumulator. A hydraulic motor is coupled to the first pump, and a controlled partial stream of hydraulic oil flows through this motor to the tank. Energy, which is exploited to operate the first pump, is recovered from the pressure difference which arises when the hydraulic oil is expanded from the hydraulic drive or pressure accumulator to the pressureless tank. A second pump is used convey hydraulic oil from the tank to the pressure accumulator, so that the pressure accumulator can be recharged again as often as necessary.

It is known from U.S. Pat. No. 6,142,259 that the pump for conveying hydraulic oil in a hydraulic elevator can be operated by an electronic power output stage. Such power output stages are known under the name "frequency converters".

SUMMARY OF THE INVENTION

The invention is based on the task of simplifying the hydraulic circuit and of lowering the demand for electrical energy, especially the peak demand, i.e., on the task of decreasing the connected electrical load.

In the hydraulic elevator according to the invention, a main pump produces the flow of hydraulic oil between the pressure accumulator and the hydraulic drive, and a motor for driving the main pump is operated by a power output stage on the basis of signals from a control and regulating unit. An accumulator line connects the main pump directly to the pressure accumulator, and a cylinder line containing an electrically actuated open-closed type valve connects the main pump directly to the hydraulic drive.

BRIEF DESCRIPTION OF THE PRESENTLY PREFERRED EMBODIMENTS

Figure 1:
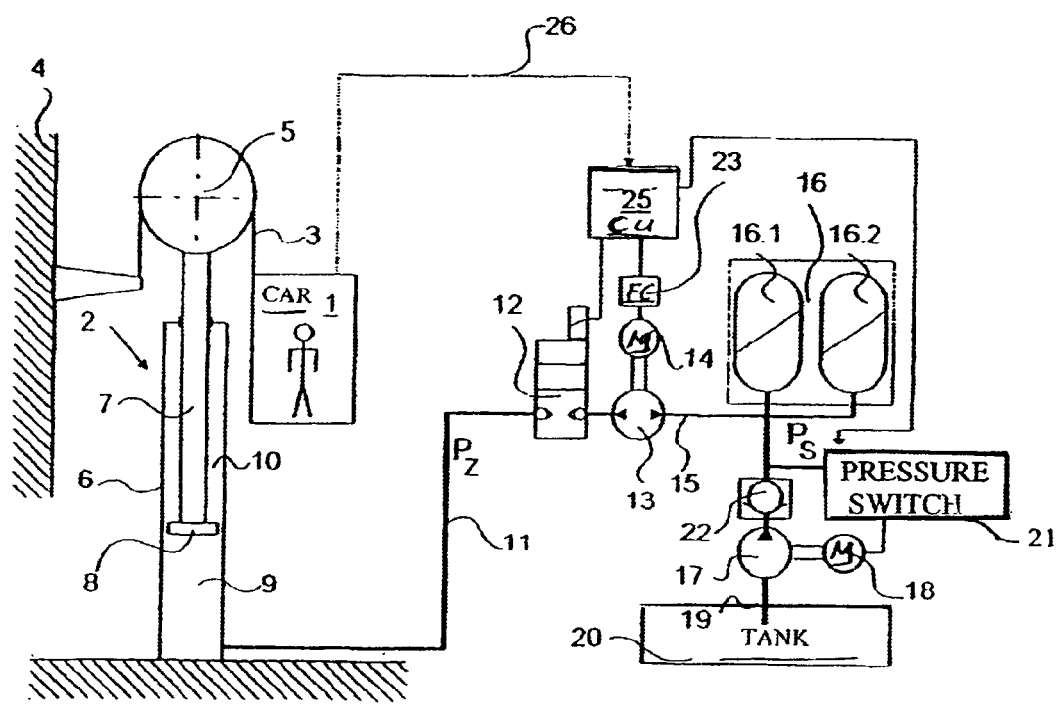
FIG. 1 shows a diagram of a hydraulic elevator.

In FIG. 1, an elevator car 1 can be moved by a hydraulic drive 2. The force is transmitted from the hydraulic drive 2 to the car 1 in a manner known in and of itself by means of a cable 3, which passes over a pulley 5, attached to the hydraulic drive. One end of the cable 3 is attached to a part of the building 4, but it can also be attached to the guide rails (not shown) for the elevator car 1. Known arrangements of the cable 3 and pulleys 5 which deviate from that indicated above are also possible within the scope of the invention. In this respect, FIG. 1 shows only one example. It would also possible for the hydraulic drive to move the car 1 directly as described in U.S. Pat. No. 6,142,259.

The hydraulic drive 2 consists of a cylinder 6, inside which a piston 8, attached to a piston rod 7, can be moved. The other end of the piston rod 7, opposite the piston 8, carries the pulley 5. The interior space of the cylinder 6 is divided by the piston 8 into a first pressure space 9 and a second pressure space 10. The drive 2 of the exemplary embodiment illustrated here is a so-called plunger cylinder, in which the two pressure spaces 9 and 10 are connected. There is therefore no seal provided on the piston 8 against the inside wall of the cylinder 6; instead, there is only a guide (not shown). A seal is provided at the point where the piston rod 7 emerges from the hydraulic drive 2, so that the pressure space 10 is sealed off. In this type of cylinder design, the hydraulically active cross section corresponds to the cross section of the piston rod 7.

A cylinder line 11 is connected to the first pressure space 9; this line connects the pressure space 9 to a valve 12. This valve 12 is, according to the invention, an electrically actuated OPEN-CLOSED valve and can therefore be, for example, a solenoid valve. The valve 12 is connected on the other side to a pump 13, which is driven by an electric motor 14. According to the general idea of the invention, a pressure accumulator 16, which consists of at least one accumulator unit 16.1, is connected directly to the other side of the pump 13 by an accumulator line. An additional accumulator unit 16.2 is shown, which is connected in parallel to the first accumulator unit 16.1. The number of accumulator units 16.1, 16.2, 16.n present in the pressure accumulator 16 can be advantageously based on, for example, the required volume of the accumulator, which is associated in turn with the maximum distance to be traveled by the car 1. The greater the maximum possible distance, the larger the number of accumulator units 16.1, 16.2, 16.n present in the pressure accumulator 16. Both bladder-type accumulators and piston-type accumulators can be used as the pressure accumulator 16.

One branch of the accumulator line 15 leads to a charging pump 17, which is driven by an electric motor 18. The charging pump 17 is also connected by a tank line 19 to a tank 20. By means of the charging pump 17, hydraulic oil can be conveyed from the tank 20 to the pressure accumulator 16. It is advantageous for the electric motor 18 driving the charging pump 17 to be controlled automatically by a pressure switch 21. The pressure switch 21 is connected to the accumulator line 15 and is therefore able to detect the pressure, designated $P_s$, in this line. When the pressure $P_s$ falls below a predetermined value, the pressure switch 21 turns the electric motor 18 on, so that the charging pump 17 can convey hydraulic oil from the tank 20 to the pressure accumulator 16, as a result of which the pressure $P_s$ is increased until the pressure $P_s$ reaches a predetermined upper limit value, at which point the charging pump 17 is turned off again. The charging pump 17 is therefore required to run only during the time that the pressure $P_s$ in the pressure accumulator 16 is too low. The pressure $P_s$ can fall because of unavoidable leakage through the charging pump 17, but it can also fall when the temperature of the hydraulic oil falls as a result of environmental influences. If the temperature of the hydraulic oil rises as a result of such environmental influences, the pressure $P_s$ also increases. Because such a temperature increase never occurs very quickly, it is usually not necessary to provide a pressure-relief valve between the pressure accumulator 16 and the tank 20, by means of which hydraulic oil can be released as the pressure $P_s$ in the tank 20 increases. The leakage losses of the charging pump 17 are in and of themselves sufficient to prevent the pressure $P_s$ from increasing too sharply. Nevertheless, for safety reasons, a pressure-relief valve of this type can be provided. It is advantageous to install a nonreturn valve 22 between the charging pump 17 and the accumulator 16. Additional components relevant to the safety of the system such as pipe-break safety devices and emergency release devices are neither shown nor described, because such components are not relevant to the essence of the invention.

The pressure accumulator 16, as previously mentioned, can be either a bladder-type or a piston-type accumulator. Its pressure $P_s$ changes as a function of the movement of the car 1. This does not, however, have any negative effect on the open-loop or closed-loop control of the distance traveled by the car 1 or its velocity. In cases where the distance and velocity of the car 1 are automatically controlled, the signal of a flowmeter, for example, installed in the cylinder line 11 (not shown here), is used in a manner known in and of itself. It is also possible, however, to base the automatic control on the signal from a sensor which measures the rpm's of the motor 14 or the velocity of the car 1.

The preset values at which the pressure switch 21 turns the electric motor 18 on or off can advantageously be changed by the control and regulating unit 25.

A pressure $P_z$, which corresponds to the pressure in the first pressure space 9 of the hydraulic drive 2, is present in the cylinder line 11. This pressure correlates with the load of the car 1.

Because, according to the invention, the pump 13 is installed between the cylinder line 11 and the accumulator line 15, the pressure $P_z$ in the cylinder line 11 and thus in the hydraulic drive 2 acts directly on one side of the pump 13, while the pressure $P_s$ in the accumulator line 15 and thus in the pressure accumulator 16 acts on the other side, such action on either side occurring only when the elevator is operating and the valve 12 is in the "OPEN" position. In contrast to the previously known state of the art, therefore, there is no need to provide adjusting valves for automatically controlling the speed of the car. The hydraulic circuit is therefore simplified in comparison with this state of the art. The electrical drive energy for the motor 14 which drives the pump 13 required to operate the pump 13 therefore correlates with the pressure difference $P_z-P_s$ when the pump 13 is conveying hydraulic oil from the pressure accumulator 16 to the hydraulic drive 2 or with the pressure difference $P_s-P_z$ when the pump 13 is conveying hydraulic oil from the hydraulic drive 2 to the pressure accumulator 16. The pressure differences $P_s-P_z$ and $P_z-P_s$ can quite easily be negative, which means that the pump 13 is itself will be driven by the pressure difference. As a result, the motor 14 can operate as a generator, as already known. So that energy can be recovered advantageously in this way, the motor 14 is operated in the known manner by a power output stage 23, which can be, for example, a frequency converter. The power output stage 23 is controlled by a control and regulating unit 25, which receives commands from an elevator control unit (not shown). Only a control line 26 is shown, over which the commands are transmitted from the operating panels of the elevator system to the control and regulating unit 25.

While the car 1 of the elevator is stopped, the valve 12, actuated by the control and regulating unit 25, remains closed. Thus the pressure difference $P_s-P_z$ or $P_z-P_s$ acts across the valve 12 and not across the pump 13.

If the car 1 is to be moved downward, the valve 12 is opened by the control and regulating unit 25, and the motor 14 is operated in its first rotational direction so that the pump 13 conveys hydraulic oil from the pressure space 9 to the pressure accumulator 16. As this is occurring, the pressure difference $P_s-P_z$ acts across the pump 13. This means simultaneously that electrical energy for the operation of the motor 14 must be supplied only so long as the pressure $P_z$ is lower than the pressure $P_s$. Because there is no need for a speed-adjusting valve, the associated pressure loss does not occur.

If the car 1 is to be move upward, the valve 12 is again opened by the control and regulating unit 25, and the motor 14 is operated in its second rotational direction, so that the pump 13 conveys hydraulic oil from the pressure accumulator 16 to the pressure space 9. As this is occurring, the pressure difference $P_z-P_s$ acts across the pump 13. The means simultaneously that electrical energy for the operation of the motor 14 must be supplied only so long as the pressure $P_s$ is lower than the pressure $P_z$.

Because, according to the invention, basically the only electric drive power which must be produced is that which corresponds to the prevailing pressure difference $P_s-P_z$ or $P_z-P_s$, the connected load for the motor 14 can be much smaller than it would be in conventional hydraulic circuits. As a result, the motor 14 required for operation can be designed with a lower power rating. Thus money can be saved on the motor 14 itself; if the charges for electricity are based on the connected load, the savings result from the smaller connected load, and if the charges are based on the amount of power consumed, the savings result from the smaller amount of electrical energy consumed. According to the invention, furthermore, the situation is also avoided in which the potential energy of hydraulic oil which has been brought to a high pressure by a pump is not released or lost when the oil is expanded again to the tank 20.

It is also advantageous that the tank 20 can be small. The only purpose it actually serves is to hold the differential amount of hydraulic oil corresponding to the leakage losses.

The solution according to the invention also offers the remarkable advantage that there is no need for a proportional pilot valve to operate the hydraulic elevator. In many conventional hydraulic elevator systems, separate pilot valves are present for travel in the upward and downward directions. This expense is eliminated by the invention. The control and regulation chain is thus very simple and logical, because only a single element, namely, the motor 14, is used to control the speed of the car 1.

Figure 2:
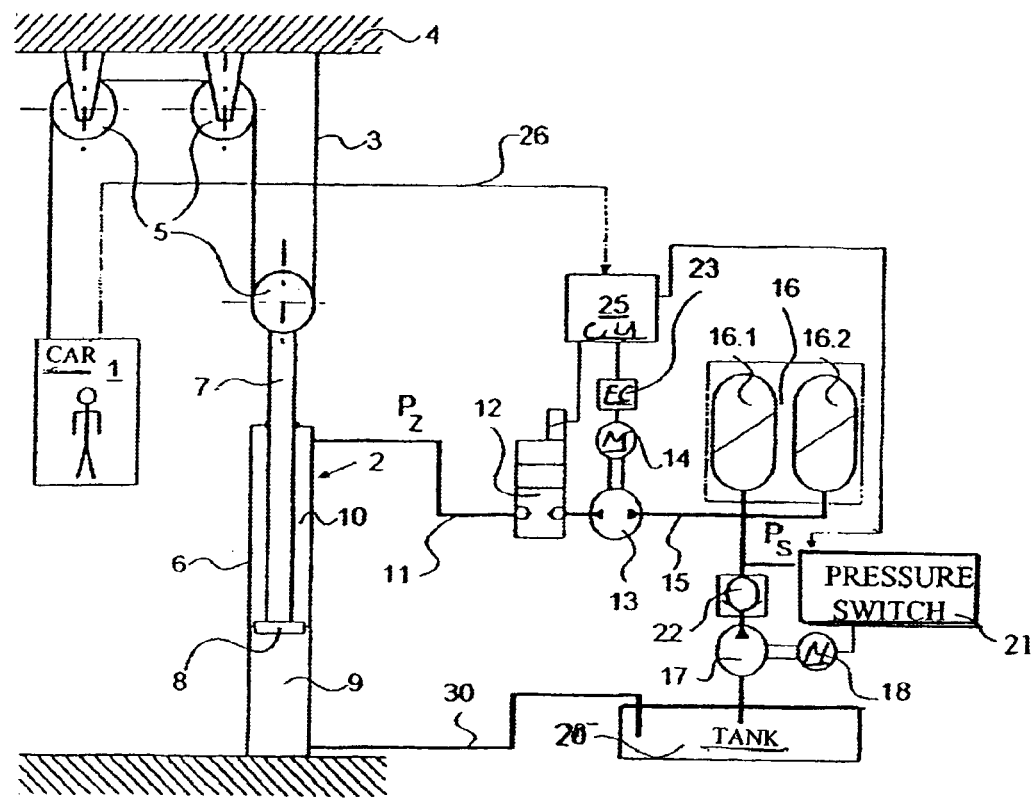
FIG. 2 shows a diagram of an advantageous variant.

FIG. 2 shows a second exemplary embodiment, which differs from the example of FIG. 1 in that the cylinder line 11 is not connected to the first pressure space 9 of the hydraulic drive 2 but rather to the second pressure space 10. The pressure space 10 is sealed off at the point where the piston rod 7 exits the hydraulic drive 2. This design variant is advantageous in several respects. Because of the piston rod 7, the cross section of the second pressure space 10 is smaller than that of the first pressure space 9. Thus less hydraulic oil must be pumped around between the hydraulic drive 2 and the pressure accumulator 16 in order to move the car 1 a certain distance. At the same time, this means that the volume of the pressure accumulator 16 can be smaller. The most essential point, however, is that the piston rod 7 is not subjected to any buckling load, because the cylinder in question here is of the pull type.

In this design of the drive 2, the pressure space 9 is sealed off from the pressure space 10 by a seal installed on the piston 8. This also means that the cylindrical inside wall of the cylinder 6 must be machined.

In addition, the force is transmitted from the hydraulic drive 2 to the car 1 in a different but also known manner. It occurs with the help of the cable 3, which is directed around pulleys 5 attached to a part 4 of the building or to the hydraulic drive 2. Instead of being attached to the building 4, the pulleys 5 can be attached, for example, to a beam at the top end of the guide rails.

Otherwise, the design according to FIG. 2 differs from that of FIG. 1 in that an additional line 30 is provided, which connects the first pressure space 9 to the tank 20. Hydraulic oil which has escaped around the piston 8 from the second pressure space 10 to the first pressure space 9 is thus diverted to the tank 20.

Figure 3:
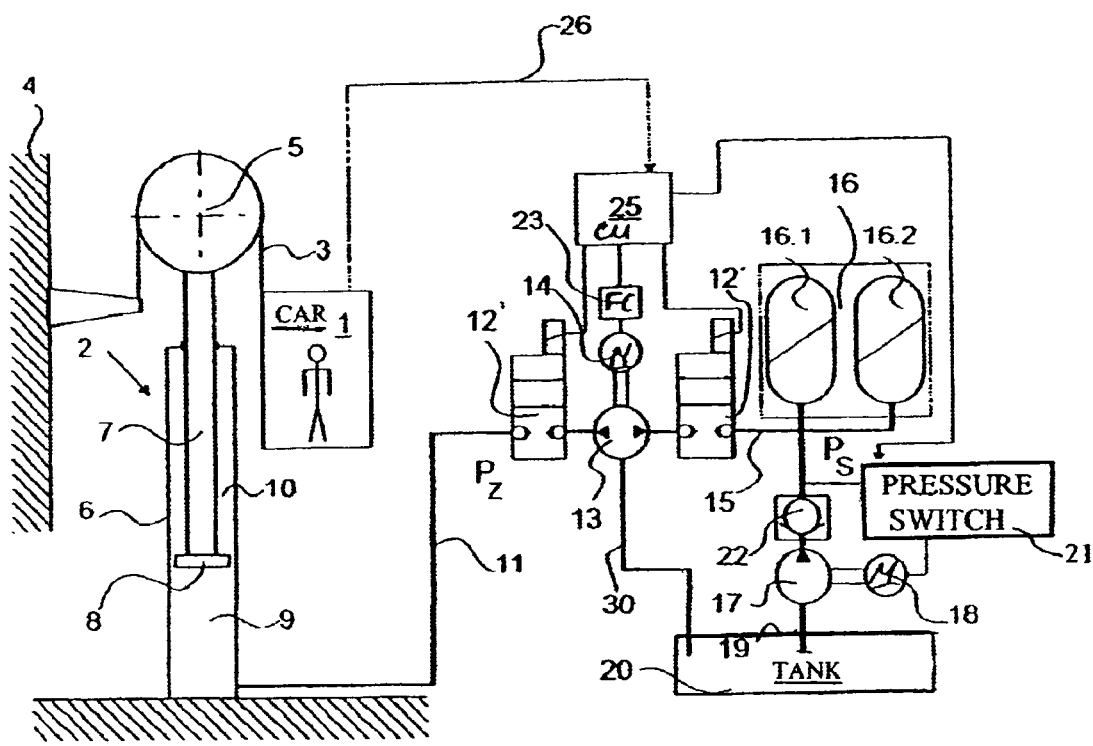
FIG. 3 shows a diagram of a special design.

FIG. 3 shows a special design for the exemplary embodiment of FIG. 1. Here an OPEN-CLOSED valve similar to valve 12 is also installed in the accumulator line 15. This valve, which operates in the same way as valve 12, is designated by the reference number 12'. Like the valve 12, the valve 12' is also moved to the "OPEN" position when the car 1 is to be moved. It is advantageous to provide this additional valve 12' in cases where the pump 13 is designed in such a way that leakage losses occur when the pump 13 is put under pressure. If the decision is made not to use the valve 12', the pump 13 must be free of leakage. Such leakage-free pumps 13, however, are more expensive. The additional valve 12' therefore makes it possible to use a simple pump 13 not free of leakage, which is advantageous. The hydraulic oil emerging through leakage from the pump 13 is returned to the tank 20 through a leakage line 30. Because, when the elevator is stopped, the valves 12 and 12' are both in the "CLOSED" position, there is no longer any leakage at the pump 13, as soon as the pressure has dropped. When a non-leakage-free pump 13 is used, the valve 12', which is closed when the elevator is stopped, reliably prevents the pressure in the pressure accumulator 16 from dropping as a result of leakage from the pump 13.

Figure 4:
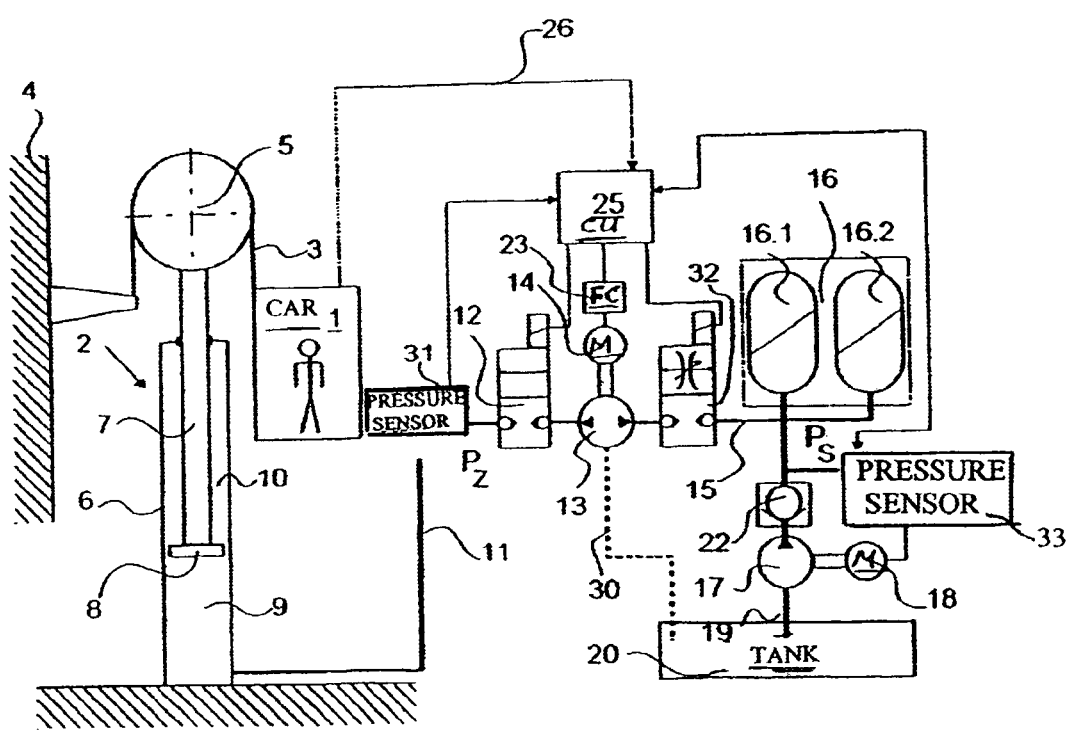
FIG. 4 shows a diagram of an especially advantageous solution.

FIG. 4 shows an especially advantageous design. This solution differs from that according to FIG. 1 in that, first, a load pressure sensor 31 is installed in the cylinder line 11, the signal of which is sent to the control and regulating unit 25. The load pressure sensor 31 therefore determines the pressure $P_z$, which correlates with the instantaneous load of the car 1. Second, this solution differs in that a pressure control valve 32, which is actuated by the control and regulating unit 25, is installed in the accumulator line 15. The actuation signal for the pressure control valve 32 is generated by the control and regulating unit 25 under consideration of the signals being received from the load pressure sensor 31 and from an accumulator pressure sensor 33, which detects the accumulator pressure $P_s$ and simultaneously fulfills the function of the pressure switch 21. The pressure control valve 32 automatically regulates the pressure on the accumulator side of the pump 13 to a value which is identical to the pressure $P_z$ in the cylinder line 11. Regardless of the load of the car 1, the same pressure $P_z$ will always be present at the two connections to the pump 13. The extremely advantageous result of this is that the pump 13 is not forced to operate against a pressure difference $P_s-P_z$ or $P_z-P_s$. The power to be supplied by the pump 13 thus corresponds merely to the frictional losses associated with the movement of the car 1, which have several components; to the friction in the hydraulic drive 2, at the cable guide system, and at the rails (not shown) of the car 1; and to the kinematic resistances. With this solution, therefore, the power to be supplied by the pump 13 and thus by the motor 14 is completely independent of the load of the car 1 and is determined only by the frictional losses associated with the movement of the car. The amount of power to be supplied is therefore reduced to level even lower than that associated with the original idea of the invention and in fact approaches the theoretical minimum.

If the pump 13 is not of the leakage-free type, then the leakage line 30 is required here, too. Because this is required only under these circumstances, the leakage line 30 is shown here only in broken line. When a design not free of leakage is used, it is also necessary for the pressure control valve 32 to include the functionality of the valve 12'. While the pressure control valve 32 is not being actuated by the control and regulating unit 25, it remains closed. When it is actuated by the control and regulating unit 25, however, it behaves like an automatically controlled throttle.

It should also be mentioned that the accumulator pressure sensor 33 also includes the functionality of the pressure switch 21. This also means that signals travel in both directions over the connection between the control and regulating unit 25 and the accumulator pressure sensor 33: first, the pressure signal from the accumulator pressure sensor 33 to the control and regulating unit 25 and, second, the signal from the control and regulating unit 25 to the accumulator pressure sensor 33 to effect the previously mentioned change in the preset values at which the pressure switch 21 turns the electric motor 18 on and off. FIG. 4 shows this by arrows at the connecting points.

It should also be mentioned that the advantageous solutions according to FIGS. 3 and 4 can also be used when the hydraulic circuit is otherwise the same as that of FIG. 2.

What is claimed is:

1. A hydraulic elevator comprising:
   a hydraulic drive including a piston displaceable in a cylinder;
   a pressure accumulator;
   a charging pump for charging said pressure accumulator with hydraulic oil from a tank, said charging pump being driven by an electric motor;
   a constant displacement main pump connected between said pressure accumulator and said cylinder for producing a flow of hydraulic oil between said pressure accumulator and said hydraulic drive;

a main motor for driving said main pump, said main motor for driving said main pump being operated by a power output stage on the basis of signals from a control and regulating unit;

an accumulator line connecting said main pump to said pressure accumulator;

a cylinder line connecting said main pump to said hydraulic drive; and an electrically actuated open-closed type valve in said cylinder line, wherein said main motor drives said main pump when a pressure differential in one direction between said pressure accumulator line and said cylinder line is positive, and said main motor operates as a generator when said pressure differential between said pressure accumulator line and said cylinder line in said one direction is negative.

2. A hydraulic elevator as in claim 1 wherein said pressure accumulator comprises at least one accumulator unit.

3. A hydraulic elevator as in claim 1 further comprising a pressure switch which detects a pressure in said accumulator line and turns said electric motor for said charging pump off and on based on said pressure.

4. A hydraulic elevator as in claim 3 wherein said control and regulating unit determines preset limit values at which the pressure switch turns said electric motor for said charging pump off and on.

5. A hydraulic elevator as in claim 1 wherein said piston separates a first pressure space from a second pressure space in said cylinder and has a piston rod extending through said second pressure space, said cylinder line being connected to said first pressure space.

6. A hydraulic elevator as in claim 1 wherein said piston separates a first pressure space from a second pressure space in said cylinder and has a piston rod extending through said second pressure space, said cylinder line being connected to said second pressure space.

7. A hydraulic elevator as in claim 3 further comprising a non-return valve between said charging pump and said accumulator, said pressure switch detecting said pressure between said non-return valve and said accumulator.

8. A hydraulic elevator as in claim 1 further comprising an electrically actuated open-closed type valve in said accumulator line.

9. A hydraulic elevator comprising:

a hydraulic drive;

a pressure accumulator;

a charging pump for charging said pressure accumulator with hydraulic oil from a tank, said charging pump being driven by an electric motor;

a main pump for producing a flow of hydraulic oil between the pressure accumulator and the hydraulic drive;

a main motor for driving said main pump, said main motor being operated by a power output stage in response to signals from a control and regulating unit;

an accumulator line connecting said main pump to said pressure accumulator;

a cylinder line connecting said main pump to said hydraulic drive;

an electrically actuated open-closed type valve in said cylinder line;

a load pressure sensor for sensing pressure in said cylinder line;

an accumulator pressure sensor for sensing pressure in said accumulator line; and a pressure control valve in said accumulator line, said pressure control valve being actuated by said control and regulating unit so that the pressure in the cylinder line is equal to the pressure in the accumulator line.

10. A hydraulic elevator comprising:

a hydraulic drive;

a pressure accumulator;

a charging pump for charging said pressure accumulator with hydraulic oil from a tank, said charging pump being driven by an electric motor;

a main pump for producing a flow of hydraulic oil between the pressure accumulator and the hydraulic drive;

a main motor for driving said main pump, said main motor being operated by a power output stage in response to signals from a control and regulating unit;

an accumulator line connecting said main pump to said pressure accumulator;

a cylinder line connecting said main pump to said hydraulic drive;

an electrically actuated open-closed type valve in said cylinder line; and a pressure switch which detects a pressure in said accumulator line and turns said electric motor for said charging pump off and on based on said pressure, wherein said control and regulating unit determines preset limit values at which the pressure switch turns said electric motor for said charging pump off and on.

11. A hydraulic elevator comprising:

a hydraulic drive;

a pressure accumulator;

a charging pump for charging said pressure accumulator with hydraulic oil from a tank, said charging pump being driven by an electric motor;

a main pump for producing a flow of hydraulic oil between the pressure accumulator and the hydraulic drive;

a main motor for driving said main pump, said main motor being operated by a power output stage in response to signals from a control and regulating unit;

an accumulator line connecting said main pump to said pressure accumulator;

a cylinder line connecting said main pump to said hydraulic drive;

an electrically actuated open-closed type valve in said cylinder line;

a pressure switch which detects a pressure in said accumulator line and turns said electric motor for said charging pump off and on based on said pressure; wherein said control and regulating unit determines preset limit values at which the pressure switch turns said electric motor for said charging pump off and on; and a non-return valve between said charging pump and said accumulator, said pressure switch detecting said pressure between said non-return valve and said accumulator.

12. A hydraulic elevator comprising:

a hydraulic drive;

a pressure accumulator;

a charging pump for charging said pressure accumulator with hydraulic oil from a tank, said charging pump being driven by an electric motor;

a main pump for producing a flow of hydraulic oil between the pressure accumulator and the hydraulic drive;

a main motor for driving said main pump, said main motor being operated by a power output stage in response to signals from a control and regulating unit;

an accumulator line connecting said main pump to said pressure accumulator;

a cylinder line connecting said main pump to said hydraulic drive;

an electrically actuated open-closed type valve in said cylinder line;

a load pressure sensor for sensing pressure in said cylinder line;

an accumulator pressure sensor for sensing pressure in said accumulator line; and a pressure control valve in said accumulator line, said pressure control valve being actuated by said control and regulating unit so that the pressure in the cylinder line is equal to the pressure in the accumulator line.

* * * * *